United States Patent
Tamai et al.

[11] Patent Number: 6,107,724
[45] Date of Patent: *Aug. 22, 2000

[54] VIBRATION WAVE DRIVING DEVICE AND APPARATUS HAVING THE SAME

[75] Inventors: Jun Tamai, Yokohama; Kazuki Fujimoto, Kawasaki, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/923,466

[22] Filed: Sep. 4, 1997

[30] Foreign Application Priority Data

Sep. 9, 1996 [JP] Japan ..................... 8-237852

[51] Int. Cl.$^7$ ........................................ H02N 2/00
[52] U.S. Cl. ........................................ 310/323.11
[58] Field of Search ..................... 310/323, 323.11

[56] References Cited

U.S. PATENT DOCUMENTS

| | | | |
|---|---|---|---|
| 4,580,073 | 4/1986 | Okumura et al. ............... | 310/323 |
| 4,779,018 | 10/1988 | Okuno et al. ................... | 310/323 |
| 5,028,833 | 7/1991 | Kawai ............................. | 310/323 |
| 5,122,700 | 6/1992 | Tamai et al. .................... | 310/323 |
| 5,124,611 | 6/1992 | Tamai et al. .................... | 310/317 |
| 5,134,334 | 7/1992 | Onishi et al. ................... | 310/323 |
| 5,148,075 | 9/1992 | Shirasaki ........................ | 310/323 |
| 5,231,325 | 7/1993 | Tamai et al. .................... | 310/323 |
| 5,329,201 | 7/1994 | Shirasaki ........................ | 310/323 |
| 5,410,204 | 4/1995 | Imabayashi et al. ........... | 310/323 |
| 5,506,462 | 4/1996 | Tamai et al. .................... | 310/328 |
| 5,574,326 | 11/1996 | Chiba et al. .................... | 310/323 |
| 5,594,291 | 1/1997 | Tamai et al. .................... | 310/323 |
| 5,600,196 | 2/1997 | Tamai ............................. | 310/323 |
| 5,684,353 | 11/1997 | Fujimoto et al. ............... | 310/323 |
| 5,760,529 | 6/1998 | Tamai et al. .................... | 310/323 |

FOREIGN PATENT DOCUMENTS 5-211785   8/1993   Japan ................... H02N 2/00

*Primary Examiner*—Thomas M. Dougherty
*Attorney, Agent, or Firm*—Fitzpatrick, Cella, Harper & Scinto

[57] ABSTRACT

A vibration wave driving device comprises a vibration member in which a vibration is generated, and a contact member contactable with the vibration member and movable relative to the vibration member by the vibration generated in the vibration member, wherein a material having resin as a chief component is used for one of a first contact portion of the vibration member, which contacts the contact member, and a second contact portion of the contact member, which contacts the vibration member, and wherein a ceramic of carbide origin is used for the other one of the first contact portion and the second contact portion.

23 Claims, 9 Drawing Sheets

FIG. 2

| FIG. 2A | FIG. 2B | FIG. 2C |

FIG. 2A

| SAMPLE NO. | CLASSIFICATION | SURFACE MATERIAL | BASE MATERIAL | MANUFACTURING PROCESS |
|---|---|---|---|---|
| 1 | METAL | STAINLESS STEEL | STAINLESS STEEL | ROLLING |
| 2 | | Ni-B | HIGH CARBON TOOL STEEL | METAL PLATING |
| 3 | | Ni-P | HIGH CARBON TOOL STEEL | METAL PLATING |
| 4 | | Ni-B-W | HIGH CARBON TOOL STEEL | METAL PLATING |
| 5 | | Cr | HIGH CARBON TOOL STEEL | METAL PLATING |
| 6 | | HIGH CARBON TOOL STEEL | HIGH CARBON TOOL STEEL | ROLLING |
| 7 | ANODIC OXIDATION FILM | ALUMITE | *ALUMINU ALLOY | ELECTROCHEMICAL REACTION |
| 8 | CERMET | HARD METAL | HARD METAL | POWDER SINTERING |
| 9 | | TiC BASED | TiC BASED | POWDER SINTERING |
| 10 | | Ni-P-SiC | Ni-P-SiC | EUTECTOID METAL PLATING |
| 11 | | TRANSMISSIBLE Al2O3 | TRANSMISSIBLE Al2O3 | POWDER SINTERING |
| 12 | | SAPPHIRE | SAPPHIRE | POWDER SINTERING |
| 13 | | NON-POROUS Al2O3 | NON-POROUS Al2O3 | POWDER SINTERING |
| 14 | | NON-POROUS ZrO2 | NON-POROUS ZrO2 | POWDER SINTERING |
| 15 | | Al2O3 CONTAINED SiC | Al2O3 CONTAINED SiC | POWDER SINTERING |
| 16 | | Al2O3/ZrO2 | Al2O3/ZrO2 | POWDER SINTERING |
| 17 | | SiN | SiN | POWDER SINTERING |
| 18 | | SiC | SiC | POWDER SINTERING |
| 19 | | SiC (REACTIVE POWDER SINTERING) | SiC (REACTIVE POWDER SINTERING) | POWDER SINTERING |
| 20 | | SIALON | SIALON | POWDER SINTERING |
| 21 | | AlN | AlN | POWDER SINTERING |
| 22 | | TiN (NITRIDE) | HIGH CARBON TOOL STEEL | PVD |
| 23 | | WC (CARBIDE) | HIGH CARBON TOOL STEEL | CVD |
| 24 | | TiC (CARBIDE) | HIGH CARBON TOOL STEEL | CVD |
| 25 | | SiC (CARBIDE) | HIGH CARBON TOOL STEEL | CVD |

*JIS A5056

FIG. 2B

| SMOOTHING PROCESS | COMPOSITION (wt.%) | MACRO HARDNESS (Hv) | CONVEX PORTION RATE (%) |
|---|---|---|---|
| LAPPING USING 3μm DIAMOND + BUFFING USING CLOTH AND 1μm DIAMOND | Cr13%, C1%, Fe | 700 (SINTERING) | 100 |
| | Ni96%, B4% | 800 | 100 |
| | Ni92%, P8% | 550 | 100 |
| | Ni60%, B4%, W36% | 850 | 100 |
| | | 900 | 100 |
| | C1% | 770 (SINTERING) | 100 |
| | | 400 | 100 |
| | WC88%, Co12% | 1250 | 100 |
| | TiC78%, Ni6%, mO10% | 1550 | 100 |
| | Ni62%, P8%, SiC30% | 650 | 25 |
| | | 2000 | 100 |
| | | 2200 | 100 |
| | Al2O3 99.7% | 1800 | 100 |
| | | 1400 | 100 |
| | SiC150% CONTAINED | 1700 | 10 |
| | Al2O3 50% | 1600 | 20 |
| | | 1800 | 30 |
| | SiC100% | 2500 | 100 |
| | SiC80%, Si20% | 2000 | 30 |
| | | 1800 | 10 |
| | | 1200 | 8 |
| | TiN100% | 2400 | 100 |
| | WC100% | 2000 | 100 |
| | TiC100% | 3000 | 100 |
| | SiC100% | 2800 | 100 |

FIG. 2C

| CENTER LINE AVERAGE ROUGHNESS Ra (μm) | ABRASION LOSS OF SAMPLE (μm) | THICKNESS OF TRANSFER FILM ON SAMPLE SURFACE | ABRASION LOSS OF COUNTER-CONTACT (μm) | EVALUATION OF ABRASION LOSS | STARTING CHARACTERISTIC OF MOTOR |
|---|---|---|---|---|---|
| NOT GREATER THAN 0.01 | 1.6 | THIN | 15 | BAD | BAD |
| | 0.8 | THIN | 8 | BAD | BAD |
| | 1.5 | THIN | 25 | BAD | BAD |
| | 0.8 | THIN | 7 | BAD | BAD |
| | 0.5 | THICK | 55 | BAD | BAD |
| | 1.2 | THIN | 12 | BAD | BAD |
| | 5 | THIN | 25 | BAD | BAD |
| | 0 | THIN | 10 | BAD | BAD |
| | 0 | THIN | 18 | BAD | BAD |
| 0.1 | 0.3 | THIN | 18 | BAD | GOOD |
| NOT GREATER THAN 0.01 | 0 | THIN | 1 | GOOD | BAD |
| | 0 | THIN | 1 | GOOD | BAD |
| | 0 | THIN | 1 | GOOD | BAD |
| | 0 | THICK | 30 | BAD | BAD |
| 0.15 | 0 | THIN | 3 | GOOD | GOOD |
| 0.08 | 0 | THICK | 35 | BAD | GOOD |
| 0.05 | 0 | NOT ASCERTAIN | 3 | GOOD | GOOD |
| NOT GREATER THAN 0.01 | 0 | NOT ASCERTAIN | $\approx 0$ | EXCELLENT | BAD |
| 0.05 | 0 | NOT ASCERTAIN | $\approx 0$ | EXCELLENT | GOOD |
| 0.16 | 0 | THIN | 3 | GOOD | GOOD |
| 0.25 | 0 | THIN | 6 | GOOD | GOOD |
| NOT GREATER THAN 0.01 | 0 | THIN | 2 | GOOD | BAD |
| | 0 | NOT ASCERTAIN | $\approx 0$ | EXCELLENT | BAD |
| | 0 | NOT ASCERTAIN | $\approx 0$ | EXCELLENT | BAD |
| | 0 | NOT ASCERTAIN | $\approx 0$ | EXCELLENT | BAD |

THICK: NOT LESS THAN 1 μm
THIN: LESS THAN 1 μm

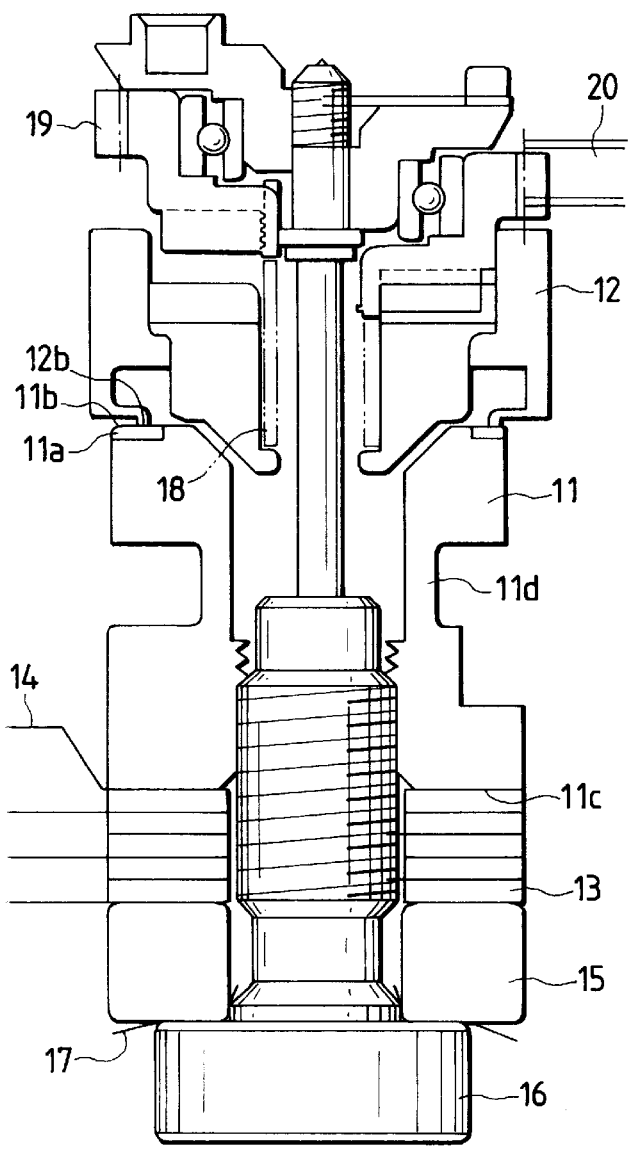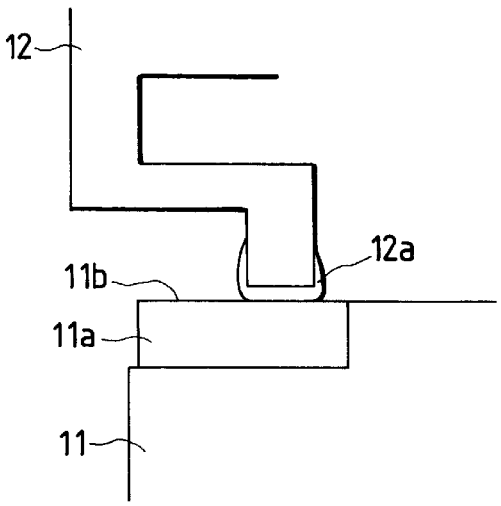
FIG. 4
FIG. 5

FIG. 6

| FIG. 6A | FIG. 6B | FIG. 6C |

FIG. 6A

| SAMPLE NO. | CLASSIFICATION | SURFACE MATERIAL | BASE MATERIAL | MANUFACTURING PROCESS |
|---|---|---|---|---|
| 31 | METAL | STAINLESS STEEL | STAINLESS STEEL | ROLLING |
| 32 | | Ni-B | HIGH CARBON TOOL STEEL | METAL PLATING |
| 33 | | Ni-P | HIGH CARBON TOOL STEEL | METAL PLATING |
| 34 | | Ni-B-W | HIGH CARBON TOOL STEEL | METAL PLATING |
| 35 | | Cr | HIGH CARBON TOOL STEEL | METAL PLATING |
| 36 | | HIGH CARBON TOOL STEEL | HIGH CARBON TOOL STEEL | ROLLING |
| 37 | ANODIC OXIDATION FILM | ALUMITE | *ALUMINU ALLOY | ELECTROCHEMICAL REACTION |
| 38 | CERMET | Ni-P-SiC | Ni-P-SiC | EUTECTOID METAL PLATING |
| 39 | SERAMIC | TRANSMISSIBLE Aℓ2O2 | TRANSMISSIBLE Aℓ2O2 | POWDER SINTERING |
| 40 | | SAPPHIRE | SAPPHIRE | POWDER SINTERING |
| 41 | | NON-POROUS Aℓ2O3 | NON-POROUS Aℓ2O3 | POWDER SINTERING |
| 42 | | SiN | SiN | POWDER SINTERING |
| 43 | | SiC (REACTIVE POWDER SINTERING) | SiC (REACTIVE POWDER SINTERING) | POWDER SINTERING |
| 44 | | WC (CARBIDE) | HIGH CARBON TOOL STEEL | CVD |
| 45 | | TiC (CARBIDE) | HIGH CARBON TOOL STEEL | CVD |
| 46 | | SiC (CARBIDE) | HIGH CARBON TOOL STEEL | CVD |

*JIS A5056

FIG. 6B

| SMOOTHING PROCESS | COMPOSITION (wt.%) | MACRO HARDNESS (Hv) | CONVEX PORTION RATE (%) |
|---|---|---|---|
| LAPPING USING 3μm DIAMOND + BUFFING USING CLOTH AND 1μm DIAMONT | Cr13%, C1%, Fe | 700 (SINTERING) | 100 |
| | Ni96%, B4% | 800 | 100 |
| | Ni92%, P8% | 550 | 100 |
| | Ni60%, B4%, W36% | 850 | 100 |
| | C1% | 900 | 100 |
| | | 770 (SINTERING) | 100 |
| | Ni72%, P8%, SiC20% | 400 | 30 |
| | Al2O3 99.7% | 620 | 100 |
| | SiC100% | 2000 | 100 |
| | SiC80%, Si20% | 2200 | 100 |
| | WC100% | 1800 | 100 |
| | | 2500 | 100 |
| | | 2000 | 30 |
| | TiC100% | 2000 | 100 |
| | SiC100% | 3000 | 100 |
| | | 2800 | 100 |

FIG. 6C

| CENTER LINE AVERAGE ROUGHNESS Ra (μm) | ABRASION LOSS OF SAMPLE (μm) | THICKNESS OF TRANSFER FILM ON SAMPLE SURFACE | ABRASION LOSS OF COUNTER-CONTACT (μm) | EVALUATION OF ABRASION LOSS |
|---|---|---|---|---|
| NOT GREATER THAN 0.01 | NOT ASCERTAIN (NOT GREATER THAN 0.01) | THIN : LESS THAN 1μm | 2 | GOOD |
| | | | ≈0 | EXCELLENT |
| | | | 1 | GOOD |
| | | | ≈0 | EXCELLENT |
| | | | 3 | GOOD |
| | | | 1 | GOOD |
| 0.08 | | | 5 | GOOD |
| | | | 18 | BAD |
| | | | ≈0 | GOOD |
| | | | ≈0 | GOOD |
| 0.05 | | NOT ASCERTAIN | ≈0 | GOOD |
| | | | ≈0 | EXCELLENT |
| | | | ≈0 | EXCELLENT |
| NOT GREATER THAN 0.01 | | | ≈0 | EXCELLENT |
| | | | ≈0 | EXCELLENT |
| | | | ≈0 | EXCELLENT |

VIBRATION WAVE DRIVING DEVICE AND APPARATUS HAVING THE SAME

BACKGROUND OF THE INVENTION

1. Field of the Invention

This invention relates to the materials of members used in a vibration wave driving device.

2. Related Background Art

As the frictional materials of a vibration wave driving device, there have been proposed various combinations of the materials of a vibration member and a portion of contact with a contact member contacting with the vibration member, and for example, in a vibration wave motor as a vibration wave driving device described in Japanese Patent Application Laid-Open No. 5-211785, a combination of resin of the polyimide origin and alumina is proposed as the material of the contact surface of a moving member as the contact member contacting with the contact surface of the vibration member. This combination provides good performance regarding abrasion.

In the above-described example of the prior art, however, when the driving device was actually driven as a motor, there was a case where there was very rarely formed film called transfer film which was the phenomenon that depending on the load condition and the number of revolutions, the component of resin adhered to the surface of alumina of the partner member.

As long as this transfer film is uniformly formed, the disadvantage that the coefficient of friction is reduced and torque becomes small only occurs. That is, the pressure contact force between the frictional materials can be increased correspondingly to the small coefficient of friction.

In the example of the prior art, however, depending on the driving condition of the motor, the state of formation of the transfer film differs, and as the state of formation, there are various cases such as a case where the transfer film is thinly and uniformly formed on the whole surface, a case where the transfer film is not formed at all, and a case where the transfer film is thickly formed at some locations.

A fluctuation of the motor performance occurs due to the difference between these states of formation of the transfer film. Also, if the motor is left under high humidity conditions and thereafter is again left under low humidity conditions, resin and alumina will be secured to each other and a so-called mutual adherence of the frictional materials will occur. If the adherence occurs, the motor will not start, and even if it starts, resin will be partially peeled off and will adhere to the surface of alumina which is the partner material. Therefore, the state of contact of the frictional sliding portion will become unstable, causing an irregularity of rotation of the motor.

SUMMARY OF THE INVENTION

One aspect of the present invention relates to a vibration wave driving device having a vibration member and a contact member, and one of a first portion of said vibration member which contacts with at least said contact member and a second portion of said contact member which contacts with at least said vibration member is formed of a material having resin as a chief component and the other is formed of ceramics of the carbide origin, whereby the adherence phenomenon can be alleviated.

Other objects of the present invention will become apparent from the following detailed description.

BRIEF DESCRIPTION OF THE DRAWINGS

FIG. 2, which is comprised of FIGS. 2A, 2B and 2C, is a chart showing various frictional materials used in the first embodiment and the evaluations thereof.

FIG. 4 is a cross-sectional view showing a vibration wave motor as a second embodiment of the vibration wave driving device according to the present invention.

FIG. 5 is a cross-sectional view of the essential portions of the vibration wave motor of FIG. 4.

FIG. 6, which is comprised of FIGS. 6A, 6B and 6C, is a chart showing various frictional materials used in the second embodiment and the evaluations thereof.

DESCRIPTION OF THE PREFERRED EMBODIMENTS

First Embodiment

Figure 1A:
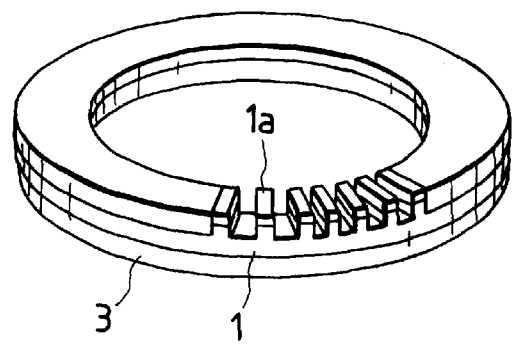
FIGS. 1A, 1B and 1C show a vibration wave motor as a first embodiment of a vibration wave driving device according to the present invention, FIG. 1A being a perspective view of a vibration member, FIG. 1B being a fragmentary side view of a vibration member, and FIG. 1C being a schematic view showing a driving state.
Figure 1B:
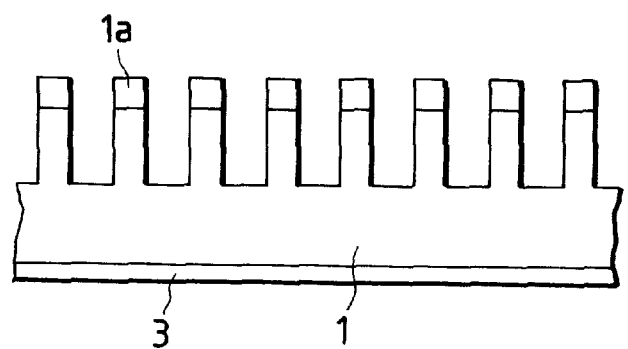
Figure 1C:
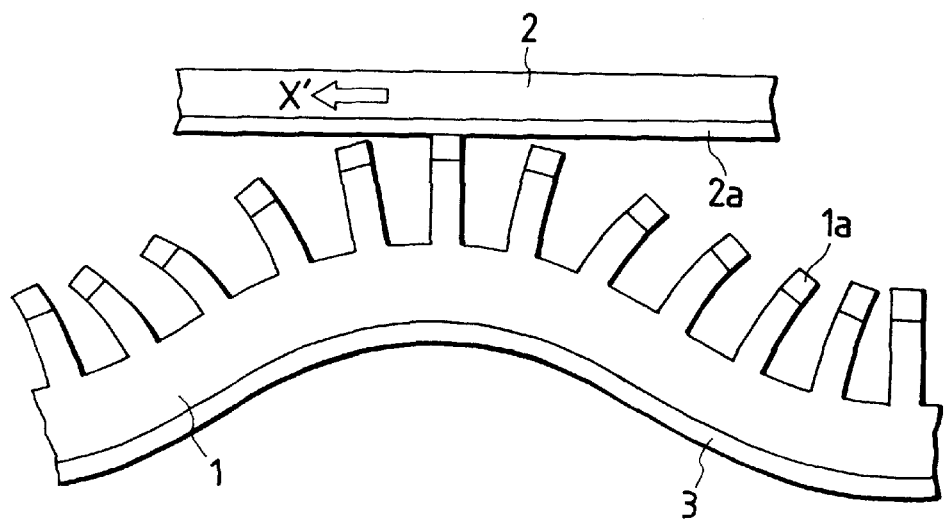

FIGS. 1A to 1C show a ring-like vibration wave motor which is a vibration wave driving device according to a first embodiment of the present invention. The principle of driving of this vibration wave motor is already known from U.S. Pat. No. 4,580,073 and therefore will be briefly described herein.

In FIGS. 1A to 1C, the reference numeral 1 designates a vibration member formed with a number of projections, and frictional material 1a is joined to the tip ends of the projections, i.e., frictional contact portions. This frictional material 1a is resin of the fluorine origin containing 20% by weight of carbon fiber.

On the other hand, the reference numeral 2 denotes a moving member as a contact member, and a frictional material is joined to the contact portion thereof. The reference numeral 3 designates an electro-mechanical energy converting element joined to the vibration member 1, and this electromechanical energy converting element 3 receives an alternating voltage and produces a travelling vibration wave in the projected portions of the vibration member 1. Also, the moving member 2 is in pressure contact with the vibration member 1 under the pressing force of pressing means, not shown. As a result, the moving member receives a frictional driving force and is rotated thereby, although this movement is a relative one caused through a frictional force; and if the vibration member is fixed, the moving member will be rotated and, if conversely, the moving member is fixed, the vibration member will be rotated.

FIGS. 2A to 2C are lists of frictional materials (samples 1 to 25) studied in the vibration wave motor of the present embodiment.

These frictional materials were made as a ring-like thin plate, whereafter it was adhered on the surface of the moving member 2 by means of an adhesive agent of the epoxy origin to thereby provide a sliding surface. Regarding the frictional material made by the vapor deposition process of samples 22 to 25, a ring-like thin plate made of high carbon tool steel having a thickness of 0.3 mm was used as a substrate and a film of each kind was formed thereon by vapor deposition. This ring was stuck on the surface of the moving member 2 by means of an adhesive agent, as previously described.

Thereafter, a surface corresponding to this frictionally sliding surface was subjected to smoothing work by a lapping machine of copper supplied with diamond abrasive grains of a size of 3 μm. Next, minute sharp portions present on the surface were made into a rounded smooth shape by the use of buff made of cloth having diamond abrasive grains of a size of 1 μm imparted thereto.

Figure 3A:
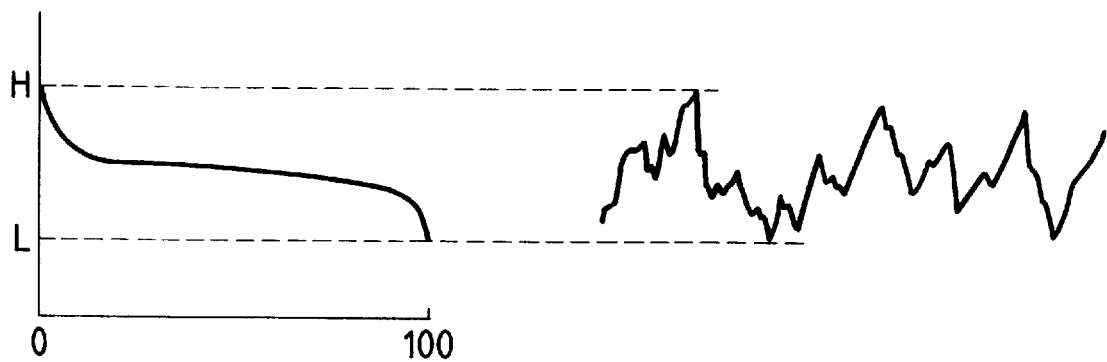
FIGS. 3A and 3B are graphs showing the relation between the surface roughness shape and the bearing ratio.
Figure 3B:
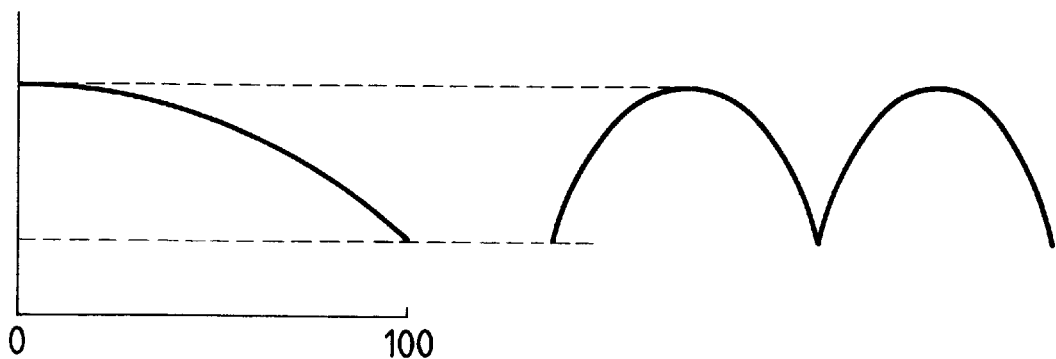

By this treatment, the center line surface roughness (Ra) of each frictional material used in the present embodiment was 0.25 μm or less. In the case of silicon carbide made by the reactive sintering method of sample 19, hard portions of SiC protruded from Si portions by the order of 0.2 μm. However, there were no sharp portions and a smooth shape as shown in FIG. 3B was presented.

Here, the rate of convex portions referred to in the present embodiment will be shown below. Usually, analyzing the state of the surface roughness of a material, the areas occupied by the most convex portion to the most concave portion are distributed at various rates. For example, on a surface finished by the use of a grinder or free abrasive grains, the area occupied by the vicinity of the highest portion and the vicinity of the lowest portion is relatively small, and representing it by a graph called the bearing ratio as shown in FIG. 3A, it assumes an S-shape when the height of the concavo-concavity is plotted as the axis of ordinates and the cumulative value of the area thereof is plotted as the axis of abscissas.

Now, as regards the rate of the convex portions defined herein, this is the ratio of the area occupied by the highest portion (H) to a portion lower by 0.05 μm in the surface shape. The value of 0.05 μm is a distance which may cause the aforementioned condensation of moisture. That is, the greater is this rate, the more increases the area in which moisture is condensed and the aforementioned adhering force of the moving member and the vibration member is also considered to tend to increase and therefore, this rate has been defined thus.

FIGS. 2A to 2C are lists of the frictional materials provided on the moving member side, but alternatively, fluorine resin as a basic material may be secured to the moving member side and conversely, ceramics may be disposed on the friction surface of the vibration member side.

First, as regards stainless steel as sample 1 among the various samples shown in FIGS. 2A to 2C, this is stainless steel of the high carbon 13 Cr origin, and was adjusted to 700 in terms of Vickers hardness by quenching and tempering. The surface roughness was 0.05 μm at maximum and therefore, from the aforementioned definition, the rate of the convex portions is 100%. The abrasion loss of this material, i.e., the stainless steel side, was 1.6 μm as a result of the vibration wave motor of FIGS. 1A to 1C having been driven for 100 hours. The results in FIGS. 2A to 2C are all the abrasion loss after 100 hours of driving.

The abrasion powder was like red rust, and was like thin pieces when observed through a scanning type electronic microscope, and was similar to typical fretting abrasion caused in a steel material. Also, the abrasion loss of the partner material, i.e., the fluorine resin side, was 15 μm. The same tendency is also seen in the case of other materials, but generally, the greater became the abrasion loss of the material, the greater became the abrasion loss of the resin side.

Next, as regards the degree of adherence of the moving member and the vibration member, this test was done by driving the vibration wave motor for 100 hours to thereby adapt the frictional sliding surfaces to each other, and thereafter leaving the motor under an environment of relative humidity of 95% for 4 hours, and reducing the relative humidity to 50% and leaving the motor for one day, and judging whether such motor starts at a predetermined voltage. It follows that what is strong in adherence is bad in starting property. Materials of which the center line roughness of the frictional surface was 0.01 μm or less were all bad in starting. The starting property does not depend on the quality of the material, but seems to depend on the surface roughness of the frictional surface.

As regards the electroless nickel plating of samples 2 to 4, thin transfer film was formed in all of the cases, but the transfer film of materials including boron was weak in intimate contact force and could be relatively simply wiped off when the transfer film adhering to the plating surface was rubbed by cloth after the motor was driven for 100 hours.

On the other hand, strong transfer film was formed on sample 5 electrolytically chromium-plated and moreover, was spotted with a thickness of the order of 2 μm. What was relatively small in hardness like alumite of sample 7 was great in its own abrasion. This might have been the result of the carbon fiber of the partner material having expedited abrasion.

Conversely, materials of the ceramic origin of samples 11 to 25 were substantially null in their own abrasion loss. However, a great difference was found in the abrasion loss of their partner material.

The abrasion loss of the partner material was greater for sample 14 and sample 16 on which transfer film was readily formed. No transfer film was found on ceramics of the carbide origin such as SiC and moreover, the abrasion loss of the partner material was 1 μm or less (within the range of a measurement error). Above all, silicon carbide ceramics made by the reactive sintering method of sample 19 had surface roughness of 0.05 μm in terms of the center line average roughness and were relatively uneven. This is not because pores or the like were originally present in this ceramic material, but because the ceramic is a two-phase organizations differing in hardness as previously described.

The general evaluation of samples 1 to 25 is as follows. The judgment of the general evaluation is indicated by "excellent", "good", "even" and "bad".

The general evaluation of samples 1 to 10, 14 and 16 was "bad", the general evaluation of samples 11 to 13, 17 and 20 to 22 were "even", and the general evaluation of samples 15, 18, 19 and 23 to 25 was "good".

Second Embodiment

FIG. 4 shows a second embodiment of the present invention.

This embodiment takes a bar-like vibration wave motor as an example of the vibration wave driving device, and FIG. 4 shows a vertical cross-sectional view of the entire motor.

A vibrator as a vibrating member in the present embodiment is of a construction in which a piezoelectric element (an electro-mechanical or mechanico-electrical energy converting element) 13 for vibration and for a sensor and an electrode plate 14 are sandwiched between an upper vibrator constituent 11 and a lower vibrator constituent 15 for sandwiching, and are fastened together by a bolt 16. Also, an insulating sheet 17 is interposed to electrically insulate the upper vibrator constituent 11 and the bolt 16 from each other. The magnitude of vibration displacement occurring to the sliding surface 11b of the vibrator is adjusted by the thickness of a constricted portion lid. The sliding surface 12b of a moving member 12 as a contact member is urged against the sliding surface 11b by the force of a coil spring 18 which tends to stretch. The displacement occurring to the sliding surface 11b of the vibrator is transmitted to the moving member 12 by friction and is outputted to the outside through a gear 19. For example, the input gear 20 of a gear transmission apparatus is brought into meshing engagement with the gear 19, and the output gear, not shown, of this gear transmission apparatus can be brought into meshing engagement with a gear provided on a member to be driven (not shown) to thereby drive this member to be driven. The member to be driven can be a lens provided in a lens barrel, and for example, this lens is driven for auto focusing.

FIG. 5 is an enlarged view of the frictional sliding portion of FIG. 4, and shows a state in which a frictional material in the present embodiment is incorporated in it.

It is an example in which each frictional material 11a of a ring-like shape which is a discrete member is adhesively secured and coupled to the upper vibrator constituent 11. The conventional upper vibrator constituent has been such that free-cutting brass was cut, and was generally plated with Ni—P—SiC of a thickness of the order of 30 μm and the plating itself was a frictional material, but in the present embodiment, the upper vibrator constituent 11 was made by powder sintering.

This powder sintering is called the metal injection method, and a mixture of resin and iron-chromium powder is made by injection molding, and is passed through the debinder and sintering steps, whereby it becomes a product.

Also, the ring-like frictional member is press-punched in the case of stainless steel or tool steel, but as regards ceramics such as alumina, a tubular baked member was made, whereafter it was cut crosswise by a cutting grinder containing diamond abrasive grains, and was adhesively secured to the upper constituent by epoxy resin, whereafter the frictional sliding surface thereof was subjected to smoothing work similar to that in the first embodiment. In the present embodiment, the working method for ceramics adopted the above-described procedure except non-porous alumina, but regarding the non-porous alumina, a ring-like member was directly punched by the sheet molding method, whereafter it was sintered to thereby make non-porous alumina.

On the other hand, regarding the frictional member on the moving member side, as shown in FIG. 5, the frictional sliding surface of the moving member 2 is coated with a resin material 2a by spraying.

This resin is PEEK (polyether ether ketone), and the vibration wave motor used in the present embodiment has a diameter of 10 mm and is small in diameter as compared with the vibration wave motor used in the first embodiment and therefore, it is ordinary to design the displacement caused by the frictional sliding portion of the vibration member so as to be small.

Also, the width of the frictional surface is made small in conformity with the outer diameter thereof, and it is for keeping the surface pressure of the frictional contact surface uniform because if the strain (dimensionless) of the vibration member is made great, the internal loss of the vibrator also tends to become great.

Thick and long carbon fiber having a diameter of 10 μm and a length of the order of 0.1 mm can be used as a reinforcing material for the resin frictional material used in the first embodiment, and it is because the amplitude of the vibrator is great and the width of the frictional sliding surface is also great and it is possible to disperse carbon fiber uniformly in the surface thereof. Regarding the present embodiment, however, the sliding surface is narrow and therefore, the reinforcing material is not added to PEEK with the aforedescribed points taken into account.

FIGS. 6A to 6C show the results of the frictional materials of samples 31 to 46 when the vibration wave motor in the second embodiment was driven for 100 hours.

In FIGS. 6A to 6C, no abrasion was found on the materials of samples 31 to 46, whereas PEEK material as the partner material tended to be abraded if the surface roughness of this material was great. However, regarding SiC (reactive sintering method) of sample 43, the surface was somewhat as rough as 0.05 μm for Ra, but the abrasion of PEEK was not found. Further, the starting property of the motor was good.

The abrasion loss of each sample and the starting property were equal to those in the case of the first embodiment. That is, ceramics of the carbide origin of samples 42 to 46 (corresponding to samples 18, 19, 23, 24 and 25 in the first embodiment) and the partner materials thereof are all hardly abraded. Also, regarding the starting property, it did not depend on the difference between the materials, but on the surface shape as in the first embodiment.

Among samples 31 to 46, samples 38 and 43 were good in the starting property and the remaining samples were bad in the starting property.

In the general evaluation, samples 31, 33 and 35 to 41 were "bad", samples 32, 34, 42 and 44 to 46 were "good", and sample 43 was "excellent".

As will be understood from the above-described embodiments, a material having resin as a chief component is used for one of the contact portions of the vibration member and the contact member, and ceramics of the carbide origin is used for the other of the contact portions, whereby there can be provided a vibration wave driving device of high durability and stable performance.

That is, it is difficult for transfer film to be formed on the surface of the ceramics of the carbide origin, and no transfer film is formed under the ordinary driving condition of the motor. The reason for that is not definite, but it may be because the ceramics of the carbide origin is of atomic structure comprising chiefly covalent binding. As is widely known, substances of covalent binding are strong in their coupling force and are hard and do not readily react with external ions or the like. When I gave a frictional sliding test to a very active aluminum alloy (JIS A 2218) and various materials (alumina, silicon nitride, silicon carbide, sialon zirconia, 95% WC super-hard, and CVD TiC film) by the dry type, silicon carbide and TiC film exhibited little adhesion of aluminum.

The characteristic of the fact that silicon carbide ceramics was made by the reactive sintering method will be shown below.

The ceramics made by this method present a two-phase structure in which the spaces among grains of SiC are filled with Si (silicon). When I carried out a hardness test, the portion of SiC was 2,800 in terms of Vickers hardness, and the portion of Si was 1,030 in terms of Vickers hardness. In an organization having two phases remarkably differing in hardness like this, when it is subjected to smoothing work such as lapping work using free abrasive grains of diamond or the like, there is created a level difference between the phases. This level difference gives a preferable effect which will be described below.

In the vibration wave motor, the frictional material on the vibration member side and the frictional material on the moving member side as the contact member are always in intimate contact with each other. Between the two surfaces which are in intimate contact with each other, there is usually present a minute gap. When moisture is condensed in this gap, a suction force is created between the two surfaces and to separate the two surfaces from each other, a predetermined force becomes necessary. As a result, there arises the serious problem that the vibration wave motor will not start. To prevent this, there would occur to mind means of forming unevenness on the surface of the frictional material. However, this unevenness needs to maintain its shape even if friction driving is carried out for a long time. As conditions therefor, there are the following two points.

1. That there is no abrasion of the surface on which the unevenness is formed. Or that if the surface is abraded, it is abraded while keeping the unevenness.

2. That the concave portions are not filled with the transfer film on the resin material side. That is, that the transfer film is hardly formed.

For the above-mentioned conditions, in a material of two-phase organization of SiC and Si, the hardnesses of the two phases differ from each other and therefore, even if it is abraded, the abrasion will progress while the portion of SiC is forming a surface which provides a convex portion. Moreover, when I examined its surface shape, it was found that a sharp level difference did not occur in the boundary between SiC and Si, but there was formed a relatively smooth shape in which the vicinity of the central portion of SiC was highest and the vicinity of the central portion of Si was most concave. Due to this surface shape having smooth unevenness, the partner resin frictional material is not scraped and the aforedescribed phenomenon of intimate contact can be avoided.

What is claimed is:

1. A vibration wave driving device comprising:
   a vibration member that generates therein a vibration, said vibration member having a first contact portion; and
   a contact member having a second contact portion contactable with said first contact portion of said vibration member, said contact member being movable relative to said vibration member by the vibration generated in said vibration member;
   wherein one of the first contact portion of said vibration member and said second contact portion of said contact member is made of a material having resin as a chief component, and the other one of said first contact portion and said second contact portion is a ceramic of carbide origin having a plural phase hardness characteristic.

2. A device according to claim 1, wherein said vibration member comprises a base portion and a discrete first contact portion adhered to said base portion.

3. A device according to claim 1, wherein said contact member comprises a base portion and a discrete second contact portion adhered to said base portion.

4. A device according to claim 2, wherein said contact member comprises a base portion and a discrete second contact portion adhered to said base portion.

5. A device according to claim 2, wherein said vibration member has a substantially ring-like shape, said base portion is formed with a plurality of projections arranged circumferentially thereon, and said discrete first contact portion is formed on tip ends of said plurality of projections.

6. A device according to claim 1, wherein the ceramic of carbide origin is a ceramic having silicon carbide as a chief component.

7. A device according to claim 1, wherein the ceramic of carbide origin is a ceramic having titanium carbide as a chief component.

8. A device according to claim 1, wherein the ceramic of carbide origin is a ceramic having tungsten carbide as a chief component.

9. A device according to claim 3, wherein the ceramic of carbide origin is a ceramic having silicon carbide as a chief component.

10. A device according to claim 3, wherein the ceramic of carbide origin is a ceramic having titanium carbide as a chief component.

11. A device according to claim 3, wherein the ceramic of carbide origin is a ceramic having tungsten carbide as a chief component.

12. A device according to claim 1, wherein the ceramic of carbide origin is a reactive sintered ceramic.

13. A device according to claim 3, wherein the ceramic of carbide origin is a reactive sintered ceramic.

14. A device according to claim 6, wherein the ceramic of carbide origin is a reactive sintered ceramic.

15. An apparatus for driving a member to be driven with a vibration wave driving device as a drive source, said vibration wave driving device including:
   a vibration member that generates therein vibration, said vibration member having a first contact portion; and
   a contact member having a second contact portion contactable with said first contact portion of said vibration member, said contact member being movable relative to said vibration member by the vibration generated in said vibration member;
   wherein one of said first contact portion of said vibration member and said second contact portion of said contact member is made of a material having resin as a chief component, and the other one of said first contact portion and said second contact portion is a ceramic of carbide origin having a plural phase hardness characteristic.

16. An apparatus according to claim 15, wherein said vibration member comprises a base and a discrete first contact portion adhered to said base portion.

17. An apparatus according to claim 15, wherein said contact member comprises a base and a discrete second contact portion adhered to said base portion.

18. An apparatus according to claim 16, wherein said contact member comprises a base portion and a discrete second contact portion adhered to said base portion.

19. An apparatus according to claim 16, wherein said vibration member has a substantially ring-like shape, said base portion is formed with a plurality of projections arranged circumferentially thereon, and said first contact portion is formed on tip ends of said plurality of projections.

20. An apparatus according to claim 15, wherein the ceramic of carbide origin is a ceramic having silicon carbide as a chief component.

21. An apparatus according to claim 15, wherein the ceramic of carbide origin is a ceramic having titanium carbide as a chief component.

22. An apparatus according to claim 15, wherein the ceramic of carbide origin is a ceramic having tungsten carbide as a chief component.

23. An apparatus according to claim 15, wherein the ceramic of carbide origin is a reactive sintered ceramic.

* * * * *

UNITED STATES PATENT AND TRADEMARK OFFICE
CERTIFICATE OF CORRECTION

PATENT NO. : 6,107,724
DATED : August 22, 2000
INVENTOR(S) : JUN TAMAI, ET AL.

It is certified that error appears in the above-identified patent and that said Letters Patent is hereby corrected as shown below:

Column 2

Line 53, "if conversely," should read --conversely, if".

Signed and Sealed this

First Day of May, 2001

Attest:

NICHOLAS P. GODICI

Attesting Officer          Acting Director of the United States Patent and Trademark Office